US010257713B2

United States Patent
Yilmaz et al.

(10) Patent No.: US 10,257,713 B2
(45) Date of Patent: Apr. 9, 2019

(54) METHODS AND APPARATUS FOR INTERFERENCE MANAGEMENT AND RESOURCE SHARING

(71) Applicant: Nokia Technologies Oy, Espoo (FI)

(72) Inventors: Osman Nuri Can Yilmaz, Espoo (FI); Jari Petteri Lunden, Espoo (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 59 days.

(21) Appl. No.: 14/894,946

(22) PCT Filed: Jun. 6, 2013

(86) PCT No.: PCT/IB2013/054670
§ 371 (c)(1),
(2) Date: Nov. 30, 2015

(87) PCT Pub. No.: WO2014/195765
PCT Pub. Date: Dec. 11, 2014

(65) Prior Publication Data
US 2016/0127910 A1    May 5, 2016

(51) Int. Cl.
*H04W 16/04* (2009.01)
*H04W 72/08* (2009.01)
(Continued)

(52) U.S. Cl.
CPC ........... *H04W 16/04* (2013.01); *H04W 16/32* (2013.01); *H04W 72/048* (2013.01);
(Continued)

(58) Field of Classification Search
CPC ... H04W 72/04; H04W 72/085; H04W 8/005; H04W 24/00; H04W 48/16;
(Continued)

(56) References Cited

U.S. PATENT DOCUMENTS

| 2011/0255431 A1 | 10/2011 | Wang et al. |
| 2013/0005377 A1* | 1/2013 | Wang ............... H04W 72/0406 455/509 |

(Continued)

FOREIGN PATENT DOCUMENTS

| WO | 2011124015 | 10/2011 |
| WO | 2012061251 | 5/2012 |

OTHER PUBLICATIONS

International Search Report and Written Opinion received for corresponding Patent Cooperation Treaty Application No. PCT/IB2013/054670, dated Feb. 21, 2014, 14 pages.

(Continued)

*Primary Examiner* — Romani Ohri
(74) *Attorney, Agent, or Firm* — Mintz Levin Cohn Ferris Glovsky and Popeo, P.C.

(57) ABSTRACT

Improved systems and techniques for communication in an environment in which muting of resources is used to avoid interference between cells. If a cell, represented by a macro eNB for example, is muting resources, those resources can be made available, under appropriate conditions, to user devices, such as UEs, engaging in device to device communication. Allocation of muted resources to D2D UEs can be based on meeting of conditions, such as that the D2D UEs be outside of a specified proximity to a cell, such as a small cell, using the resources, or that the D2D UEs transmit at less than a specified power. The UEs may take measurements to determine if the conditions are met and report the measurements to their base stations, which then determine whether to allocate the muted resources and configure the UEs with resource allocation information.

18 Claims, 4 Drawing Sheets

(51) Int. Cl.
  *H04W 16/32* (2009.01)
  *H04W 72/04* (2009.01)
  *H04W 76/14* (2018.01)
(52) U.S. Cl.
  CPC ..... *H04W 72/0473* (2013.01); *H04W 72/082* (2013.01); *H04W 76/14* (2018.02)
(58) Field of Classification Search
  CPC .............. H04W 52/146; H04W 52/367; H04W 52/244; H04W 72/08; H04W 72/087
  See application file for complete search history.

(56) References Cited

U.S. PATENT DOCUMENTS

| | | | | |
|---|---|---|---|---|
| 2013/0157709 A1* | 6/2013 | Ji | ........................ | H04W 52/04 455/522 |
| 2014/0003301 A1* | 1/2014 | Madan | ................ | H04W 72/042 370/280 |
| 2014/0094183 A1* | 4/2014 | Gao | .................... | H04W 72/048 455/450 |
| 2014/0355557 A1* | 12/2014 | Peng | .................... | H04W 16/14 370/330 |

OTHER PUBLICATIONS

Hyang Sin Chae et al. "Radio resource allocation scheme for device-to-device communication in cellular networks using fractional frequency reuse", Communications (APCC), 2011 17th Asia-Pacific Conference On, IEEE, Oct. 2, 2011, pp. 58-62.

Pekka Janis et al. "Device-to-device communication underlying cellular communications systems", Int'l J. of Communications, Network and System Sciences, vol. 02, No. 03, Jan. 1, 2009 p. 169-178.

* cited by examiner

METHODS AND APPARATUS FOR INTERFERENCE MANAGEMENT AND RESOURCE SHARING

RELATED APPLICATION

This application was originally filed as PCT Application No. PCT/IB2013/054670 filed Jun. 6, 2013.

FIELD OF THE INVENTION

The present invention relates generally to data communication. More particularly, the invention relates to systems and techniques for inter-cell interference coordination techniques that provide for sharing of available resources during times when interference prevention causes resources to become unused and therefore available.

BACKGROUND OF THE INVENTION

Wireless communication has grown substantially in recent years, to the point where loads on available communication frequencies threaten to consume their entire capacity. Large numbers of communication base stations, or nodes, comprise larger nodes serving a relatively large geographic area, and smaller, lower power base stations, serving smaller geographic areas. The coverage area of a node defines a cell, and a number of smaller cells may fall within the geographic area defining a larger cell. The larger cell and the smaller cells may serve large numbers of user devices, and the user devices may include those used in active communication by users, or in what is known as device to device communication, in which devices automatically communicate with other devices. In third generation partnership project (3GPP) and 3GPP long term evolution (LTE) and LTE-advanced (LTE-A) networks, base stations are referred to as eNodeBs (eNBs), with larger base stations being referred to as macro-eNBs defining macro cells and smaller base stations being referred to, for example, as micro-, pico-, or femto-eNBs defining microcells, picocells, or femtocells.

Serving the presently existing large number of devices, both conventional user devices and device to device communication devices, has led to a recognition that mechanisms to reduce interference between communication nodes and pairs and clusters of devices engaged in direct device to device communication can conserve communication resources and are increasingly important for achieving the efficiency needed to allow serving large numbers of devices in areas of overlapping coverage.

SUMMARY OF THE INVENTION

In one embodiment of the invention, an apparatus comprises at least one processor and memory storing a program of instructions. The memory storing the program of instructions is configured, with the at least one processor, to cause the apparatus to at least identify resources muted for use by a base station in a wireless communication network, determine if specified conditions are met for allocation of the resources for use by user devices in device to device communication, and, upon determination that the conditions are met, allocate the resources for use by two or more user devices in the device to device communication.

In another embodiment of the invention, an apparatus comprises at least one processor and memory storing a program of instructions. The memory storing the program of instructions is configured, with the at least one processor, to cause the apparatus to at least receive configuration information from the base station defining a resource allocation for use by the user device, upon a determination by the base station that conditions for the use of muted resources for a device to device communication are met, and direct device to device communication by the user device using muted resources according to the defined resource allocation.

In another embodiment of the invention, a method comprises identifying resources muted for use by a base station in a wireless communication network, determining if specified conditions are met for allocation of the resources for use by user devices in device to device communication and, upon determination that the conditions are met, allocating the resources for use by one or more user devices in the device to device communication.

In another embodiment of the invention, a method comprises receiving configuration information from the base station defining a resource allocation for use by the user device, upon a determination by the base station that conditions for the use of muted resources for a device to device communication are met, and directing device to device communication by the user device using muted resources according to the defined resource allocation.

In another embodiment of the invention, a computer readable medium stores a program of instructions, execution of which by a processor configures an apparatus to at least identify resources muted for use by a base station in a wireless communication network, determine if specified conditions are met for allocation of the resources for use by user devices in device to device communication, and, upon determination that the conditions are met, allocate the resources for use by one or more user devices in the device to device communication.

In another embodiment of the invention, a computer readable medium stores a program of instructions, execution of which by a processor configures an apparatus to at least receive configuration information from a base station defining a resource allocation for use by the user device, upon a determination by the base station that conditions for the use of muted resources for a device to device communication are met and direct device to device communication by the user device using muted resources according to the defined resource allocation.

In another embodiment of the invention, an apparatus comprises at least one processor and memory storing a program of instructions. The memory storing the program of instructions is configured, with the at least one processor, to cause the apparatus to at least identify muted resource information identifying resources muted by a base station and available for other uses and direct broadcast of the muted resource information.

In another embodiment of the invention, an apparatus comprises at least one processor and memory storing a program of instructions. The memory storing the program of instructions is configured, with the at least one processor, to cause the apparatus to at least identify resources muted by a base station and available for other uses and direct configuration of a user device for device to device communication using the identified muted resources.

These and other embodiments and aspects are detailed below with particularity.

DETAILED DESCRIPTION

Figure 1:
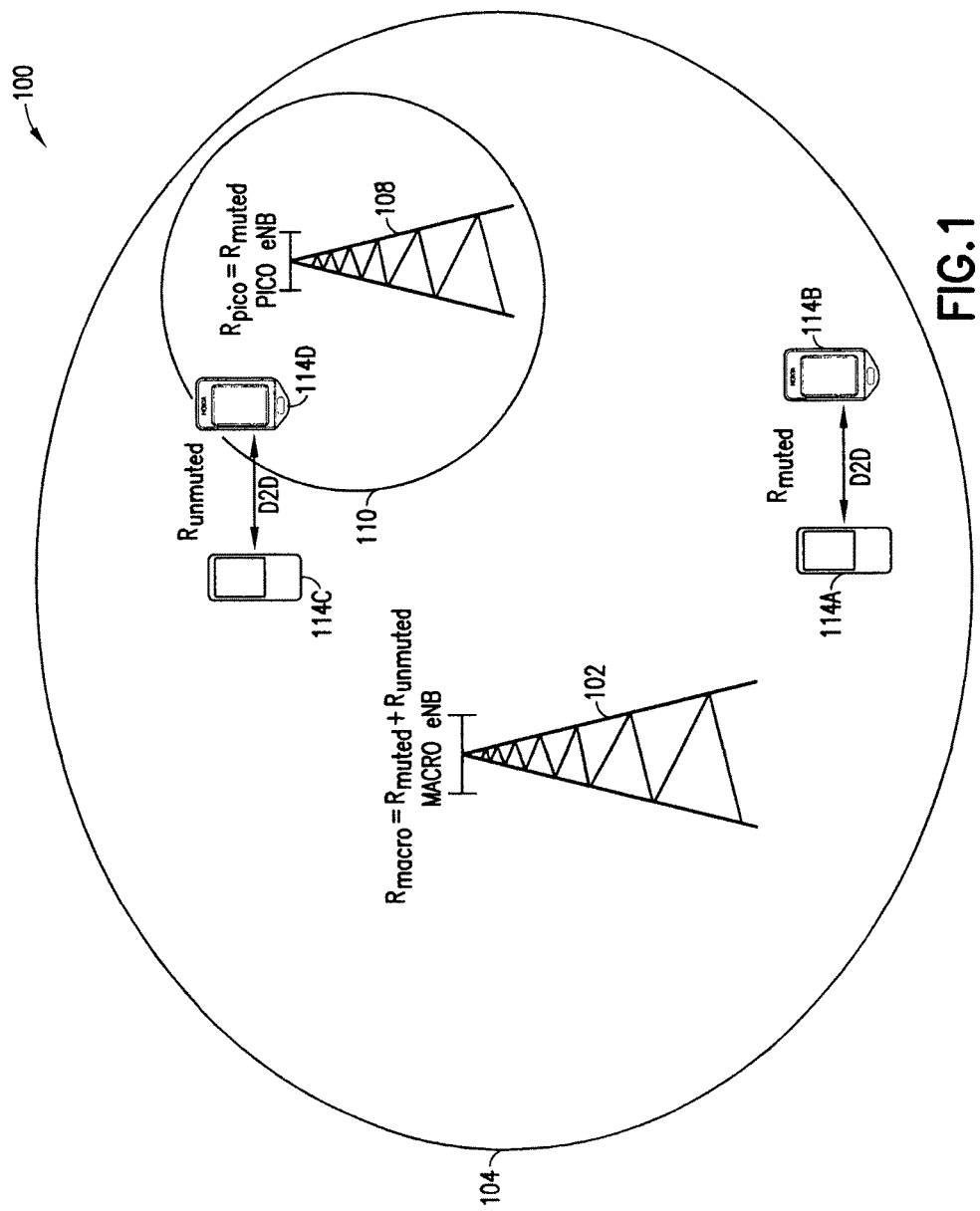
FIG. 1 illustrates a wireless communication network according to an embodiment of the present invention.

Embodiments of the present invention recognize that inter-cell interference coordination (ICIC) schemes provide for partial muting of macro layer resources, with such muting occurring, for example, in the frequency domain, such as in carrier-based ICIC, or in the time domain, such as in time division multiplexing ICIC. In the context of this invention, muted resources may refer to temporarily or permanently unused or partially used (single or multiple) time-domain resources (slot or subframe or frame) or frequency-domain resources (Physical Resource Block) or time-and-frequency domain resource pattern or band or carrier. It is also possible to use other resource dimensions, such as the code domain.

Partial muting can mitigate inter-cell interference from a macro layer to a small cell layer. For example, macro eNBs can be partially muted in the time domain, such as by macro-pico TDM enhanced ICIC (eICIC) so that pica coverage can be extended. However, the involvement of a direct device to device communication layer in a macro-pico TDM eICIC scenario poses problems not solved by existing approaches.

In one or more embodiments of the present invention, therefore, allocation of resources is managed so as to provide improved mechanisms for interference coordination in environments employing ICIC, such as macro-pico TDM ICIC, and supporting device to device (D2D) communication. Resources that are muted for interference coordination can be allocated for D2D communication, with the allocation suitably being made subject to appropriate conditions.

Examples of muted resources might, for example, comprise carriers, codes, times, frequencies, frequency patterns, or other suitable resources. To take one example, a UE can be allocated with a muted resource pattern, such as an almost blank subframe (ABS) pattern. An almost blank subframe is a subframe in which an interferer is inhibited from transmitting data so as to allow vulnerable transmitters to transmit during these subframes. Various restrictions may be imposed on allocation of muted resources to D2D communication. Allocation may, for example, be restricted to times when a limited transmit power is being used. In another example, allocation may be restricted to times when a D2D transmitter is not proximate to a neighbor cell using the allocated muted resources. One frequently occurring implementation of a neighbor cell is a small cell overlaid by a serving macro cell. Measurements may be made to detect a neighbor cell, and when a neighbor cell is detected, D2D communication on the allocated muted resources may be stopped. UEs may be allocated a second set of resources having no ICIC limitations for use when the first set of resources needs to be stopped. Such allocation can made to autonomous D2D UEs when there is no eNB control and D2D UEs can easily identify available resources and may inform each other respecting the availability of resources if needed.

In one or more embodiments of the present invention, the allocation of respective resources—for example, subframes—for a direct device to device link may be controlled by a macro cell. Respective muted resources can be used for a device to device link of both UEs communicating over a D2D link are under a partially muted macro cell, or under the same macro layer, or if overlapping resources are muted and the eNBs directing muting of overlapping resources are synchronized. When one end, that is, one UE, of a D2D link is connected to a small cell, then the muted resources of the macro eNB can be made available for the respective D2D link only if the resource allocation for the D2D link is controlled by the small cell, or the resource allocation information is available at the small cell.

The network may configure D2D UEs to perform measurements and report them before initiating the data communications between the devices or during the data communications—for example, when additional resources are needed for D2D communications. A measurement report may include information indicating whether muted resources are free of active or strongly detected cells or, in particular, small cells. Optionally, the measurement report may include information indicating whether other active or strongly detected) nodes such as UEs or relay stations are using the muted resources, so that mutual interference can be minimized between D2D and small cell layers. In addition, the devices may be further configured to report the link measurements. Measurements can be reported continuously or periodically, or may be event-triggered (for example, upon observing a change in the link quality or when a handover condition is met or a muted subframe becomes available to use). Additionally, if available, the network may utilize UE location related information, such as UE proximity indication (to a small cell), UE to pico cell distance, UE speed, and mobility status, to further improve the resource allocation. For example, if a UE is not mobile (or, though mobile, is not actually moving), it is reasonable to define the initial resource allocation as valid longer than would be appropriate for a mobile (or moving) UE, thus avoiding a need for additional measurements. In addition, a longer allocation for a non-mobile UE than for a mobile but non-moving UE may reasonably be expected to be appropriate in many circumstances.

The network may optionally set a power restriction for D2D communications by informing UEs with a power restriction parameter or directly configuring UEs with the power restriction. Such a restriction may be, for example, a maximum UE transmission power (current physical limits are 23 dBm for UE power class 3, and 30 dBm for pico cells). This UE maximum power can be configured to a lower value when muted resources are used, such as in the proximity of a small cell). Alternatively, muted resources can only be used provided that the transmission power level for the use of muted resources is below a given power restriction level.

In one or more embodiments of the invention, the D2D UEs may be configured to cease use of the muted resources if conditions relating to interference change, or if the UEs begin or continue to move, or if the UEs require larger transmission power for D2D communications. Such a configuration can call for additional measurements. In such an event, new D2D resources may be allocated, or the UEs may continue ordinary cellular communication.

FIG. 1 illustrates a network 102 according to an embodiment of the present invention, comprising a larger, higher power base station, which may be implemented as a macro eNB 102, defining a macro cell 104. The network 100 may also comprise a smaller, lower power base station, which may be implemented as a pico eNB 108, defining a pico cell 110. The network 102 may support a number of UEs, in particular UEs 114A-114D, which may be configured to engage in device to device communication. The UEs 114A and 114B may be engaged in communication using muted resources, and the UEs 114C and 114D may be engaged in communication using unmuted resources.

The UEs 114A and 114B may be using resources whose use by the eNB 102 is muted in the interest of interference coordination. Various conditions may be required for allocation of the muted resources. One optional condition might be, for example, that the UEs 114A and 114B are allocated a muted resource on the condition that a low transmission power is being used, that no strong nodes such as nearby small cells or macro cells similar to the eNB 102 or other (active or strongly detected or nearby) nodes such as UEs or relay stations under the macro layer are detected to be transmitting on the muted resources (or the transmission is at a low power, as indicated by a low reference signal strength indicator (RSSI) in the resources being allocated. Another condition allowing for allocation of resources to the D2D UEs 114A and 114B might be that they are not in the proximity of a small cell, which is to use the resources that are muted for use by the larger cell. In addition, the UEs 114A and 114B may be configured with normal cellular resources that may be allocated by the network whether or not conditions for using muted resources are met. These resources would be available when conditions for using the muted resources are not met, and a UE could be configured by the network to use these normal cellular resources under conditions when muted resources could not be used.

In addition to control by a network, the devices themselves may make determinations autonomously as to whether to use muted resources. For example, if the devices 114A and 114B are to set up a D2D link, the eNB 102 may (because both devices 114A and 114B are within its coverage) broadcast information identifying which subframes or frequency-domain resource blocks or bands or component carriers are muted. For example, if the UEs 114A and 114B have been allocated with muted subframe information, they can initiate setting up of the D2D link with the muted subframes. At least one UE in a D2D pair or D2D group may make measurements before using muted resources and, if needed, can share this information with another (or other) D2D UE(s). In such a case, the network does not actively participate in the setting up of the connection, but does provide information used by the UEs to perform the setup.

Figure 2:
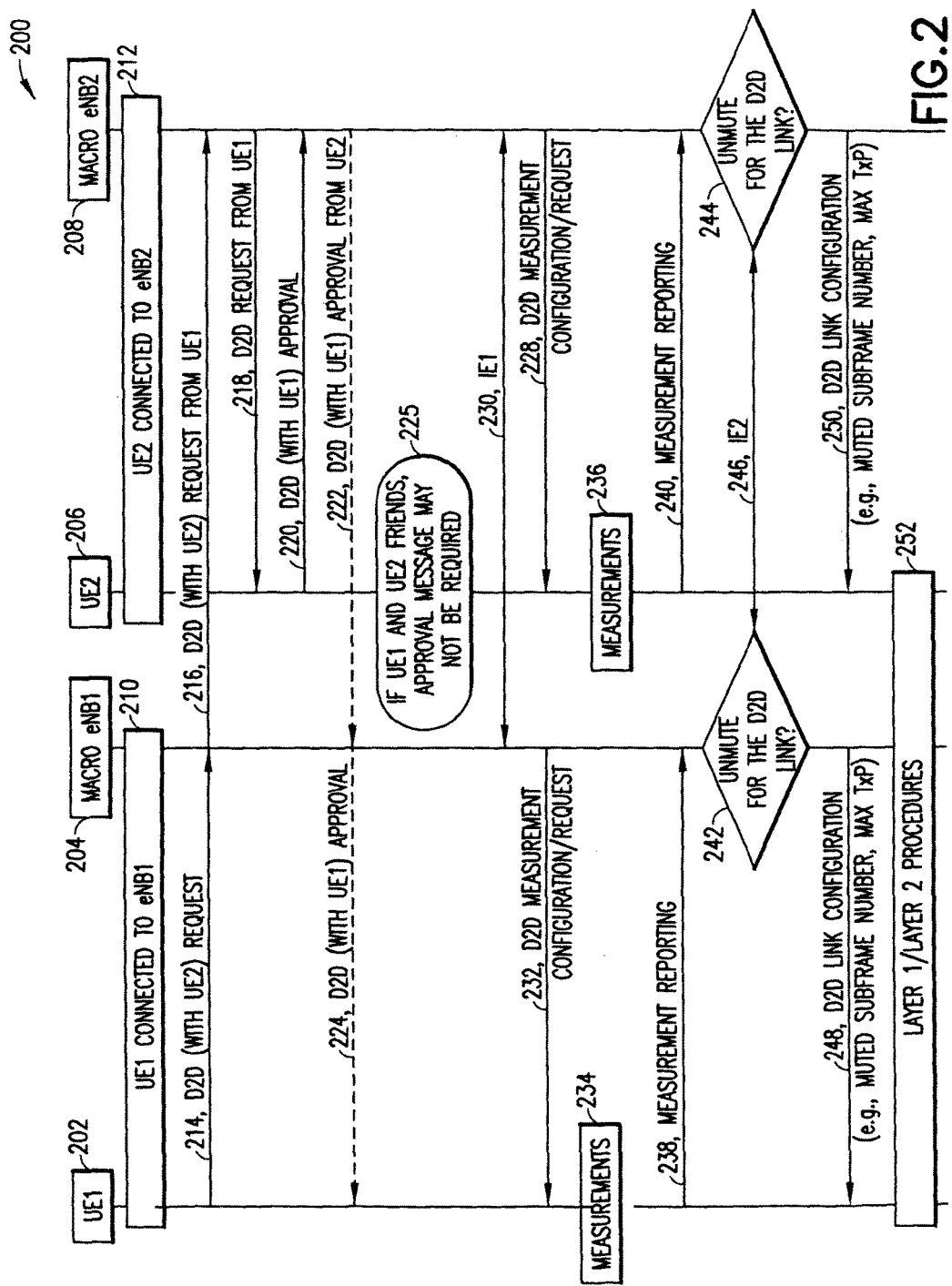
FIG. 2 illustrates a signaling diagram illustrating signaling carried out in practicing an embodiment of the present invention.

FIG. 2 illustrates a signaling flow diagram 200 showing signaling flow between devices in which multiple eNBs are used and transmissions are coordinated between them through the use of muted resources, and in which device to device communication is conducted between UEs. However, this example presents only a particular case and an implementation alternative such as muted resource allocation during a network assisted D2D connection establishment, however muted resources may be allocated during the D2D communications or autonomously by the D2D UEs as well. In the present case, a UE 202 communicates with a macro eNB 204 and a UE 206 communicates with a macro eNB 208.

A connection 210 is established between the UE 202 and the macro eNB 204 and a connection 212 is established between the UE 206 and the eNB 208. The UE 202 communicates a request signal 214 to the macro eNB 204, requesting device to device communication with the UE 206. The macro eNB 204 communicates a forwarded request signal 216 to the macro eNB 208, which communicates a relayed request signal 218 to the UE 206.

In one or more embodiments of the invention, the UE 206 communicates an approval signal 220 to the macro eNB 208, which in turn communicates a forwarded approval signal 222 to the macro eNB 204. The macro eNB 204 communicates a relayed approval signal 224 to the UE 202.

In one or more alternative embodiments of the invention, a relationship 225 may be established, defining the UE 202 and the UE 204 as "friends" or some other appropriate designation, such as a relationship identifying the UEs as collecting information relating to public safety, such as earthquake or weather information, or a joint enterprise, such as sampling of conditions. If such a relationship exists, an approval decision and message may not be needed; instead, the request may lead to automatic approval and the requesting UE may confidently presume that approval is given when requested.

A device to device measurement and configuration request 228 may be sent from the eNB 208 to the UE 206, and previously information element(s) 230 may be communicated between the macro eNB 204 and the macro eNB 208. This information element 230 may, for example, define information exchange on muted resources (allocation) or D2D band to perform measurements between the eNB 204 and the eNB 208—for example, information defining if measurements should include inter-frequency measurements, or only particular subframe patterns. The UE 206 takes measurements 234 and the UE 202 takes measurements 236 to determine conditions under which the UEs and eNBs are operating. The measurements may suitably be directed toward determining if a nearby base station is using the resources available in the muted subframes or frequencies. Such measurements may, for example, detect transmission using resources dedicated to the specified subframes or frequency-domain resource blocks or bands or carriers. D2D measurement configuration may prioritize the search of particular carriers or resource patterns. In addition, measurements may be configured based on specified priorities or reconfigured upon a reported measurement result.

The UE 202 sends a measurement reporting signal 238 to the eNB 204 and the UE 206 sends a measurement reporting signal 240 to the eNB 208. The eNB 204 and the eNB 208 make unmute decisions 242 and 244, respectively or in a coordinated manner, as to whether to unmute resources for a device to device link—that is, whether to allow subframes that are reserved as almost blank subframes (or resource blocks or component carriers) to be dedicated for use in device to device communication. Unmuting may be appropriate, for example, if the devices for which allocation is being considered are configured for low power use of the resources and if no higher power neighboring cells using the resources have been detected or the devices are not in the small cell proximity.

An information element 246 is shared between eNBs to inform the decision for each and to allow coordination of the decision or notification by each of the other's decision. The information element 246 may, for example, provide for an information exchange between eNBs to acknowledge whether or not the respective subframes are free of (active or strongly detected) cells or, in particular small cells, in proximity to the UE 202 and the UE 206. For example, if acknowledgement is positive for muted subframes, respective resources can be unmuted for the D2D link.

Alternatively or additionally to UE measurements in muted subframes, resource patterns, bands, or carriers, UE location information or UE distance to small cells or UE proximity information (for instance, to a small cell) or UE speed or mobility state can be used when allocating muted resources.

If the decision by each eNB is affirmative, the eNB 204 sends a device to device link configuration message 248 to the UE 202. The message may include, for example, a muted subframe number and maximum transmission power. The eNB 208 sends a similar message 250 to the UE 206.

The UEs 202 and 206 then engage in communication 252 using layer 1 and layer 2 procedures.

Figure 3:
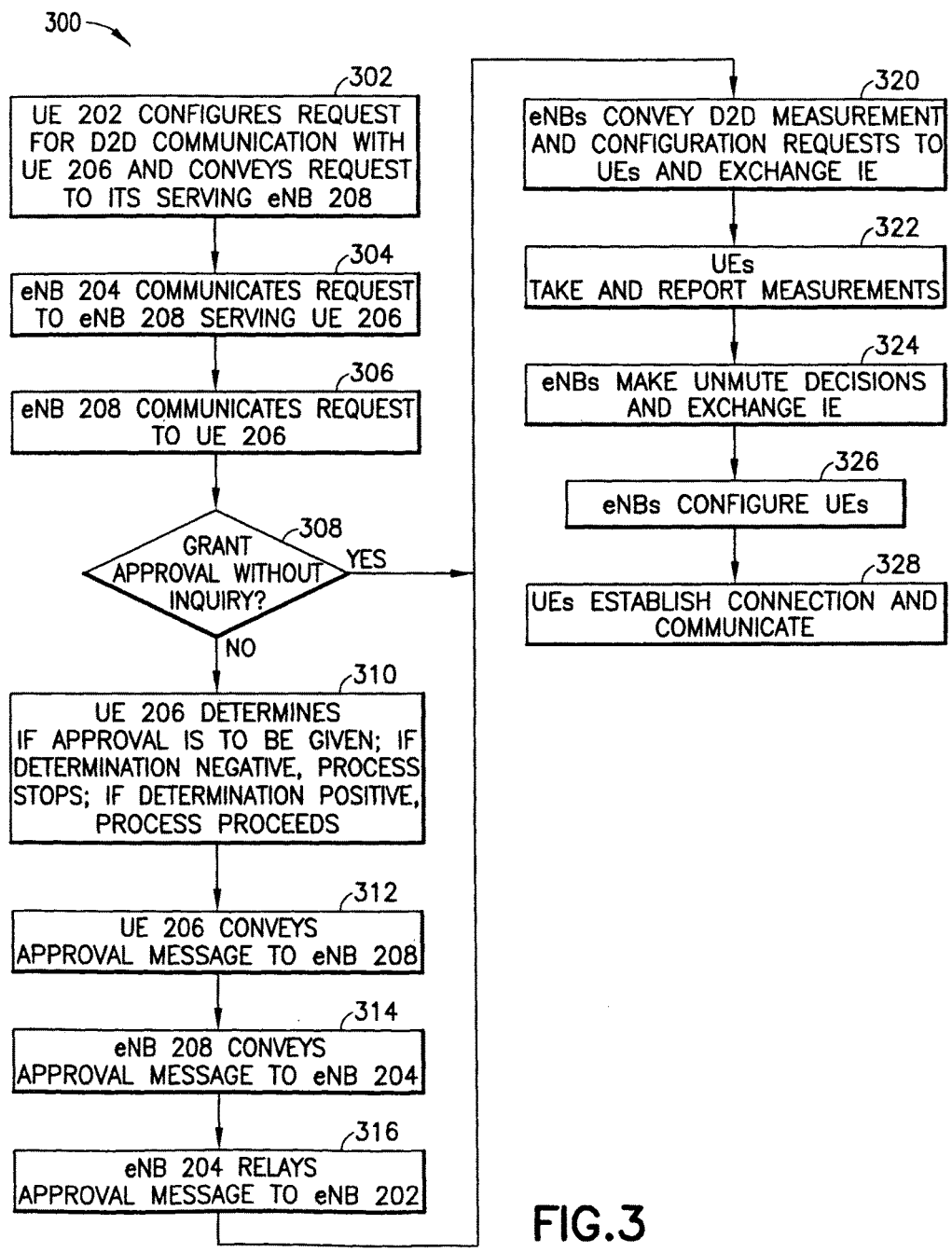
FIG. 3 illustrates a process according to an embodiment of the present invention.

FIG. 3 illustrates a process 300 according to an embodiment of the present invention. Similarly to FIG. 2, process 300 presents only a particular case and an implementation alternative such as muted resource allocation during a network assisted D2D connection establishment, however muted resources may be allocated during the D2D communications or autonomously by the D2D UEs as well for example in the idle mode of cellular communications. The process 300 is here discussed in terms of two UEs and two eNBs participating in decisions and configurations, but it will be recognized that similar processes may be carried out many times in a typical network and that a process such as the process 300 may involve more than two UEs seeking to connect.

At step 302, a first UE—for example, the UE 202 of FIG. 2 configures a request to communicate with a second UE— for example, the UE 206 of FIG. 2. The UE 202 conveys the request to a first eNB serving the UE 202. The first eNB may suitably be the eNB 204 of FIG. 2. At step 304, the eNB 204 communicates the request to a second eNB serving the UE 206. This second eNB may be, for example, the UE 208 of FIG. 2. At step 306, the eNB 208 communicates the request to the UE 206. At step 308, a determination is made as to whether approval is to be granted without inquiry. For example, if the UE 202 and the UE 206 are configured to share a specified relationship, or if they have established a cooperative or trust relationship or the like, approval may be granted automatically, with the process skipping to step 320. If approval is not to be granted without inquiry, the process proceeds to step 310 and the UE 206 determines if approval is to be given, with the process stopping if approval is not to be given and proceeding to step 312 if approval is to be given. At step 312, the UE 206 conveys an approval message to the eNB 208. The process then proceeds to step 314 and the eNB 208 relays the approval message to the eNB 204, which in turn, at step 316, relays the approval message to the UE 202.

At step 320, the eNBs convey device to device measurement configuration requests to their UEs and exchange an information element such as the information element 230 described above. At step 322, the UEs take and report measurements and at step 324, the eNBs make unmute decisions, exchanging an information element such as the information element 246 discussed above. At step 326, the eNBs configure their UEs for D2D communication and at step 328 the UEs set up the link and communicate over the link, suitably using layer 1 and layer 2 procedures.

Figure 4:
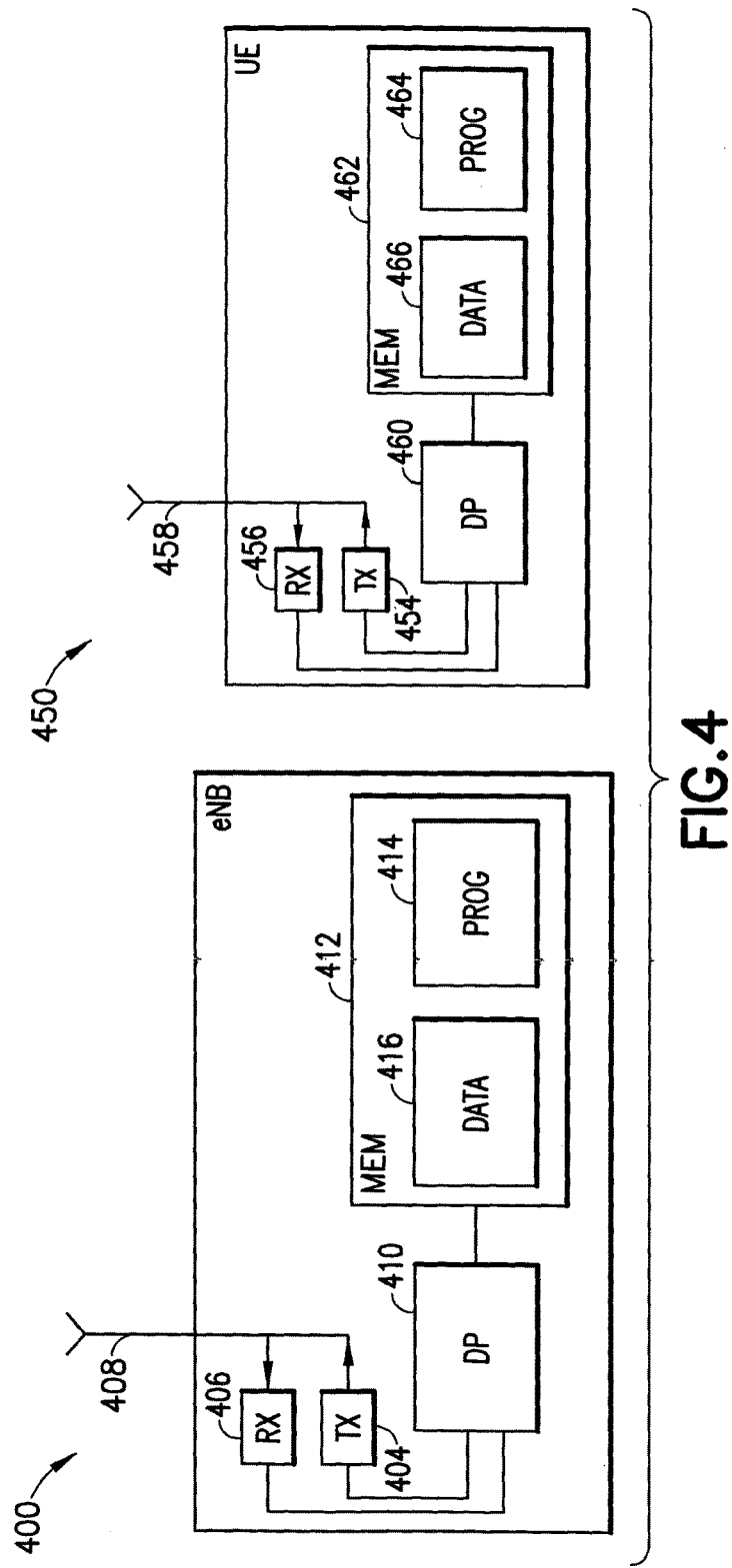
FIG. 4 illustrates elements according to an embodiment of the present invention.

Reference is now made to FIG. 4 for illustrating a simplified block diagram of details of an eNB 400 and a UE such as a UE 450.

The eNB 400 includes a suitable radio frequency (RF) transmitter 404 and receiver 406 coupled to one or more antennas 408 for bidirectional wireless communications. The eNB 400 also includes a data processor (DP) 410, and a memory (MEM) 412 that stores a program (PROG) 414 and Data 416. The UE 450 also includes a transmitter 454 and receiver 456, antenna 458, DP 460, and MEM 462 that stores a PROG 464 and Data 466.

At least one of the PROGs 414, and 464 is assumed to include program instructions that, when executed by the associated DP, enable the electronic device to operate in accordance with the exemplary embodiments of this invention as was detailed above in detail.

In general, the exemplary embodiments of this invention may be implemented by computer software executable by the DP 410 of the eNB 400 and the other DPs, or by hardware, or by a combination of software and/or firmware and hardware. The interactions between the major logical elements should be obvious to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating between the eNB 400 and the UE 450 as detailed above.

In general, the various embodiments of the UE 400 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, device to device communication devices, as well as portable units or terminals that incorporate combinations of such functions.

The MEMs 412 and 462 may be of any type suitable to the local technical environment and may be implemented using any suitable data storage technology, such as semiconductor based memory devices, magnetic memory devices and systems, optical memory devices and systems, fixed memory and removable memory. The DPs 410 and 460 may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the exemplary embodiments of this invention, as detailed by example above. As such, the exemplary embodiments of this invention may be implemented at least in part by computer software executable by the DP of the eNB 400 or UE 450 or by hardware, or by a combination of software and hardware.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
   at least one processor;
   memory storing a program of instructions;
   wherein the memory storing the program of instructions is configured, with the at least one processor, to cause the apparatus to at least:
      identify one or more muted resources associated with a base station in a wireless communication network, the one or more muted resources comprising resources that are at least partially unused by the base station;
      determine if at least one condition is met for allocation of the one or more muted resources for use by a plurality of user devices in device to device communication, the at least one condition including a transmission power associated with using the one or more muted resources for device to device communication being less than a threshold value, the at least one condition further including that the plurality of user devices in the device to device communication are a threshold distance away from a cell using the one or more muted resources, the determination being based at least in part on information reported by the plurality of user devices, and the information including a measurement, a proximity information, a user device speed, and/or a mobility status; and
      upon determining that the at least one condition is met, allocate the one or more muted resources for use by the plurality of user devices in the device to device communication.

2. The apparatus of claim 1, wherein the cell using the one or more muted resources comprise a small cell and/or a macro cell.

3. The apparatus of claim 1, wherein the determination is based at least in part on available measurements and information at the base station.

4. The apparatus of claim 1, wherein configuration of a user device comprises providing the user device identification information for a muted resource allocated for its use.

5. The apparatus of claim 1, wherein the one or more muted resources comprise macro layer resources, and wherein the one or more muted resources are at least partially unused in order to mitigate inter-cell interference from a macro layer to a small layer.

6. An apparatus comprising:
   at least one processor;
   memory storing a program of instructions;
   wherein the memory storing the program of instructions is configured, with the at least one processor, to cause the apparatus to at least:
      receive configuration information from a base station defining a resource allocation for use by a plurality of user devices in device to device communication, upon a determination by the base station that at least one condition is met for allocation of one or more muted resources for use by the plurality of user devices in the device to device communication, the at least one condition including a transmission power associated with using the one or more muted resources for the device to device communication being less than a threshold value, the at least one condition further including that the plurality of user devices in the device to device communication are a threshold distance away from a cell using the one or more muted resources, the determination being based at least in part on information reported by the plurality of user devices, and the information including a measurement, a proximity information, a user device speed, and/or a mobility status; and
      direct, in accordance with the defined resource allocation, the device to device communication by the plurality of user device using the one or more muted resources.

7. The apparatus of claim 6, wherein the apparatus is further caused to direct performance of measurements relating to the use of the one or more muted resources and report the measurement results to the base station.

8. The apparatus of claim 7, wherein directing performance of measurements is based at least in part on a preconfiguration of the user device.

9. The apparatus of claim 7, wherein directing the performance of the measurements is performed in response to a request from the base station.

10. The apparatus of claim 6, wherein the defined resource allocation defines the at least one condition for the allocation of the one or more muted resources for use by the plurality of user devices in the device to device communication.

11. The apparatus of claim 6, wherein the apparatus is further caused to control the plurality of user devices to carry out the device to device communication using alternative resources when the at least one condition for using the one or more muted resources no longer prevail.

12. A method comprising:
   receiving configuration information from a base station defining a resource allocation for use by a plurality of user devices in device to device communication, upon a determination by the base station that at least one condition is met for allocation of one or more muted resources for use by the plurality of user devices in the device to device communication, the at least one condition including a transmission power associated with using the one or more muted resources for the device to device communication being less than a threshold value, the at least one condition further including that the plurality of user devices in the device to device communication are a threshold distance away from a cell using the one or more muted resources, the determination being based at least in part on information reported by the plurality of user devices, and the information including a measurement, a proximity information, a user device speed, and/or a mobility status; and
   directing, in accordance with the defined resource allocation, the device to device communication by the plurality of user device using the one or more muted resources.

13. The method of claim 12, further comprising directing performance of measurements relating to the use of the one or more muted resources and report the measurement results to the base station.

14. The method of claim 13, wherein directing performance of measurements is based at least in part on a preconfiguration of the user device.

15. The method of claim 13, wherein directing the performance of the measurements is performed in response to a request from the base station.

16. The method of claim 12, wherein the defined resource allocation defines the at least one condition for the allocation of the one or more muted resources for use by the plurality of user devices in the device to device communication.

17. The method of claim 12, further comprising controlling the plurality of user devices to carry out the device to device communication using alternative resources when the at least one condition for using the one or more muted resources no longer prevail.

18. The apparatus of claim 1, wherein the at least one condition further includes that the plurality of user devices in the device to device communication are the threshold distance away from one or more additional user devices.

* * * * *